US007496691B2

(12) United States Patent
Ayyavu et al.

(10) Patent No.: US 7,496,691 B2
(45) Date of Patent: Feb. 24, 2009

(54) STANDARD ATA QUEUING AUTOMATION IN SERIAL ATA INTERFACE FOR CREATING A FRAME INFORMATION STRUCTURE (FIS) CORRESPONDING TO COMMAND FROM TRANSPORT LAYER

(75) Inventors: Vetrivel Ayyavu, Norcross, GA (US); Brian A. Day, Colorado Springs, CO (US); Ganesan Viswanathan, Duluth, GA (US)

(73) Assignee: LSI Corporation, Milpitas, CA (US)

( * ) Notice: Subject to any disclaimer, the term of this patent is extended or adjusted under 35 U.S.C. 154(b) by 754 days.

(21) Appl. No.: 10/628,194

(22) Filed: Jul. 28, 2003

(65) Prior Publication Data

US 2005/0027894 A1 Feb. 3, 2005

(51) Int. Cl.
*G06F 13/20* (2006.01)
*G06F 13/28* (2006.01)

(52) U.S. Cl. ............... 710/5; 710/8; 710/9; 710/10; 710/19; 710/33; 713/1; 713/2; 713/189; 370/447; 370/474

(58) Field of Classification Search ............... 710/5, 710/8–10, 19, 33; 370/447, 474; 713/189, 713/1, 2
See application file for complete search history.

(56) References Cited

U.S. PATENT DOCUMENTS

| 6,725,385 B1 * | 4/2004 | Chu et al. ............... 713/320 |
| 6,853,573 B2 * | 2/2005 | Kim et al. ............... 365/63 |
| 6,948,036 B2 * | 9/2005 | Grieff et al. ............ 711/151 |
| 6,961,787 B2 * | 11/2005 | Ooi .................... 710/19 |
| 6,965,956 B1 * | 11/2005 | Herz et al. ............. 710/74 |
| 7,171,500 B2 * | 1/2007 | Day et al. .............. 710/106 |
| 2004/0252716 A1 * | 12/2004 | Nemazie ............... 370/447 |

OTHER PUBLICATIONS

Maxtor—Serial Attached SCSI Architecture: Part 4—the Transport Layer. Oct. 2003—6 page.*

* cited by examiner

*Primary Examiner*—Tammara Peyton
(74) *Attorney, Agent, or Firm*—Suiter Swantz PC LLO

(57) ABSTRACT

A method and circuit for enhancing the performance in a serial ATA interface uses a standard ATA queue automation circuitry that handles all the transmit/receive frame information structure (FIS) operations for ATA queue commands without interrupting the higher-level software and associated hardware, firmware, and drivers. If the standard ATA queue automation circuitry and command queues are not provided, then every FIS operation will interrupt the higher layer application program. The standard ATA queuing automation circuit preprocesses higher layer commands to write into the task file registers before initiating the transport layer for an FIS transmission and provides information regarding the success or failure of a command. Commands to be executed and completion command queues are preferably used to improve the performance further. These queues may be implemented within the higher layers, as part of the standard ATA queuing automation circuit, or as software, firmware, and/or hardware functionally located between the standard ATA queuing automation circuit and the higher layers. The standard ATA queue automation circuitry provides information to program the DMA controller and activates the DMA automatically for the data transfer.

11 Claims, 5 Drawing Sheets

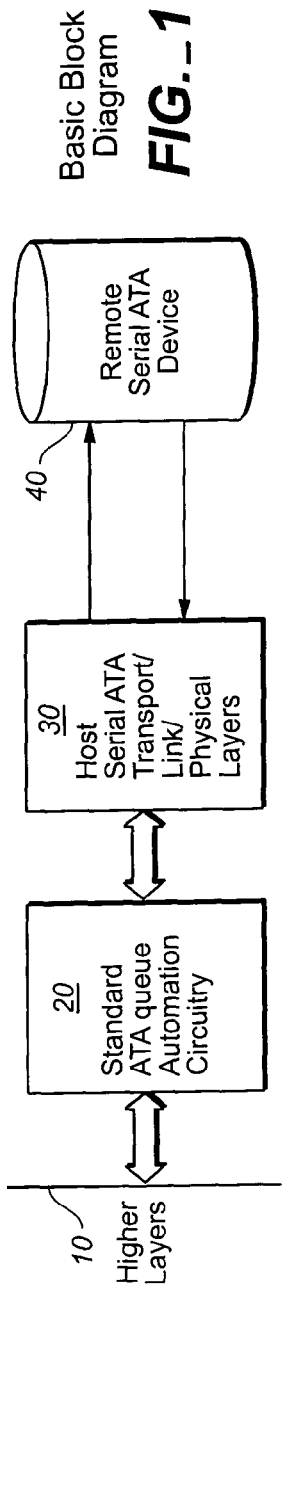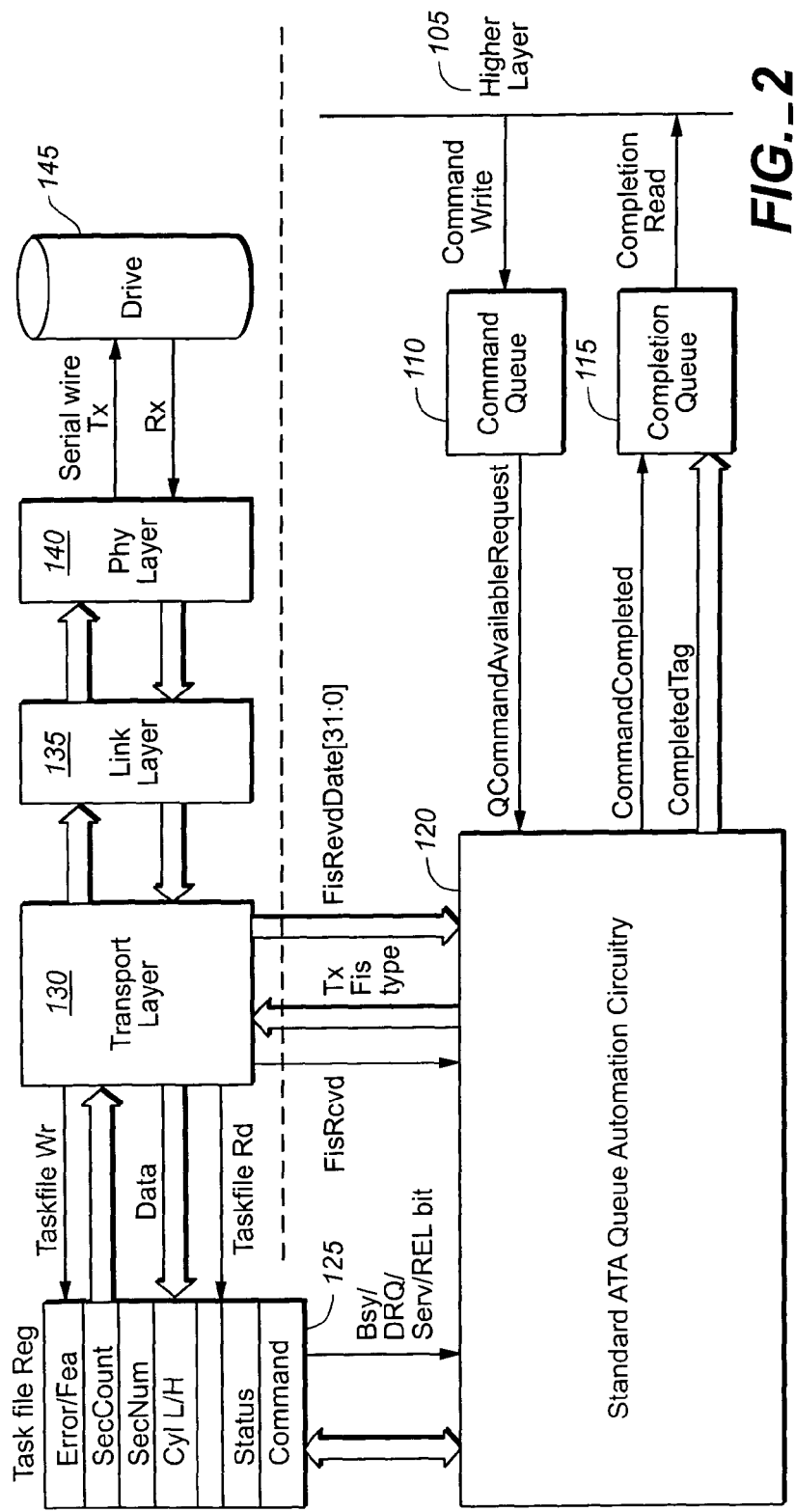

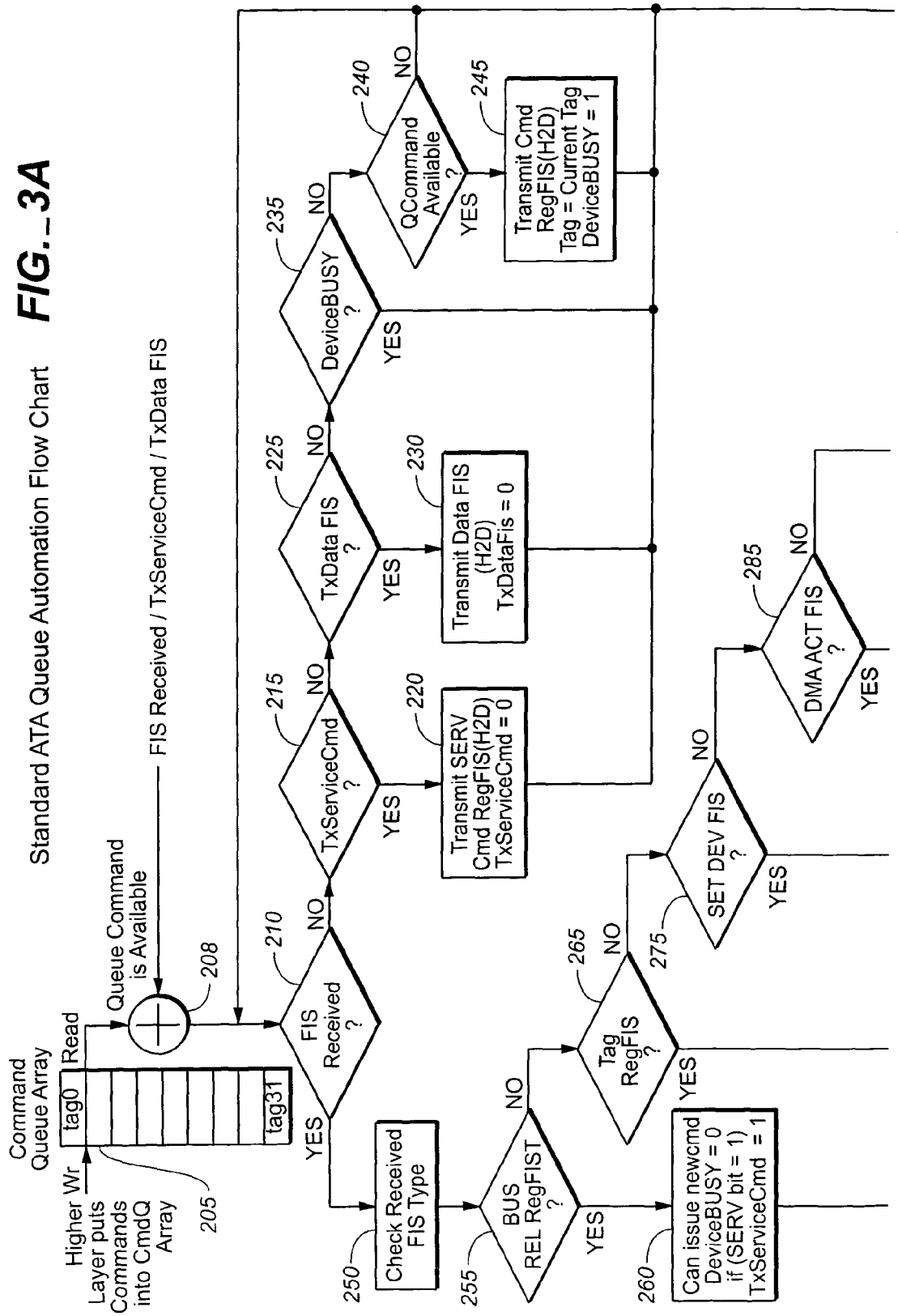
FIG._3A

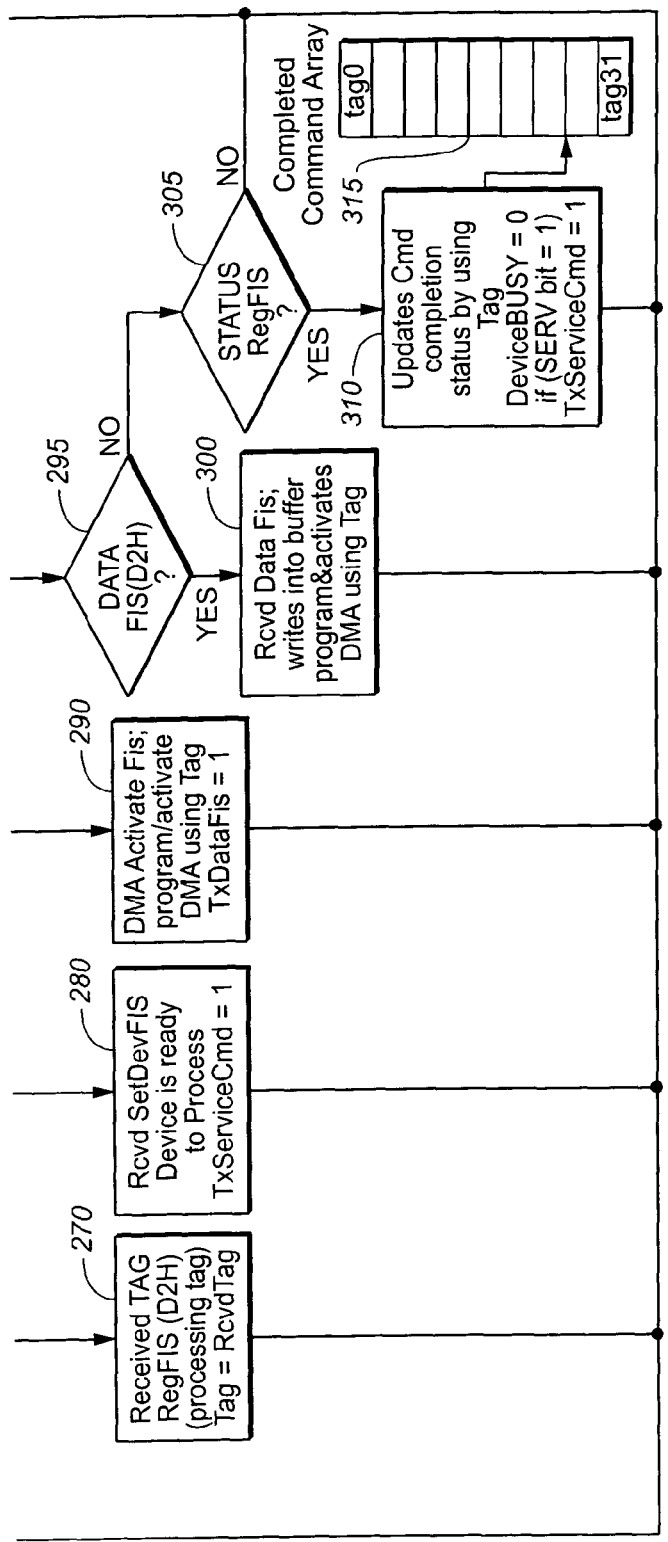
FIG._3B
FIG._3
| FIG._3A |
| FIG._3B |

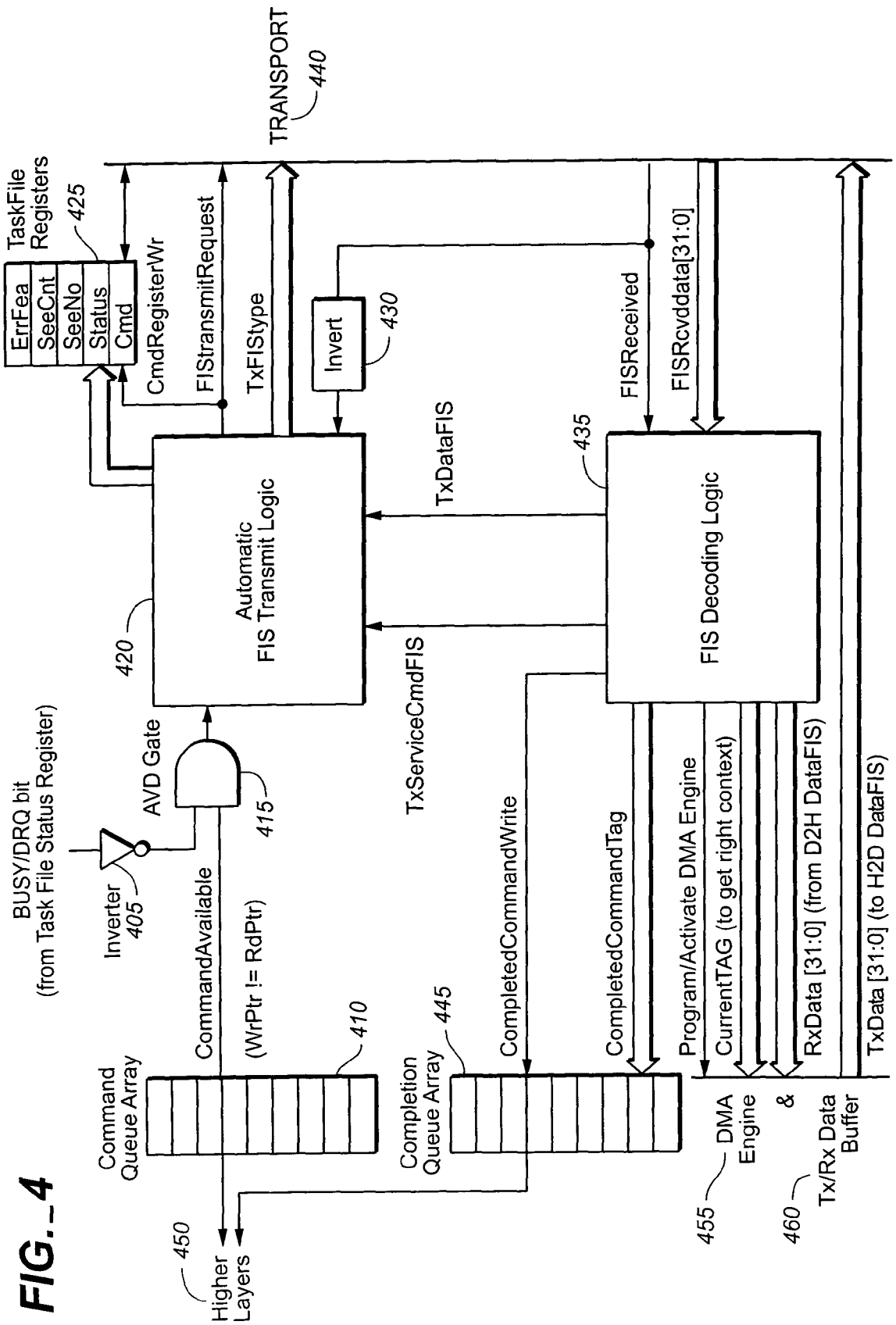
FIG._4

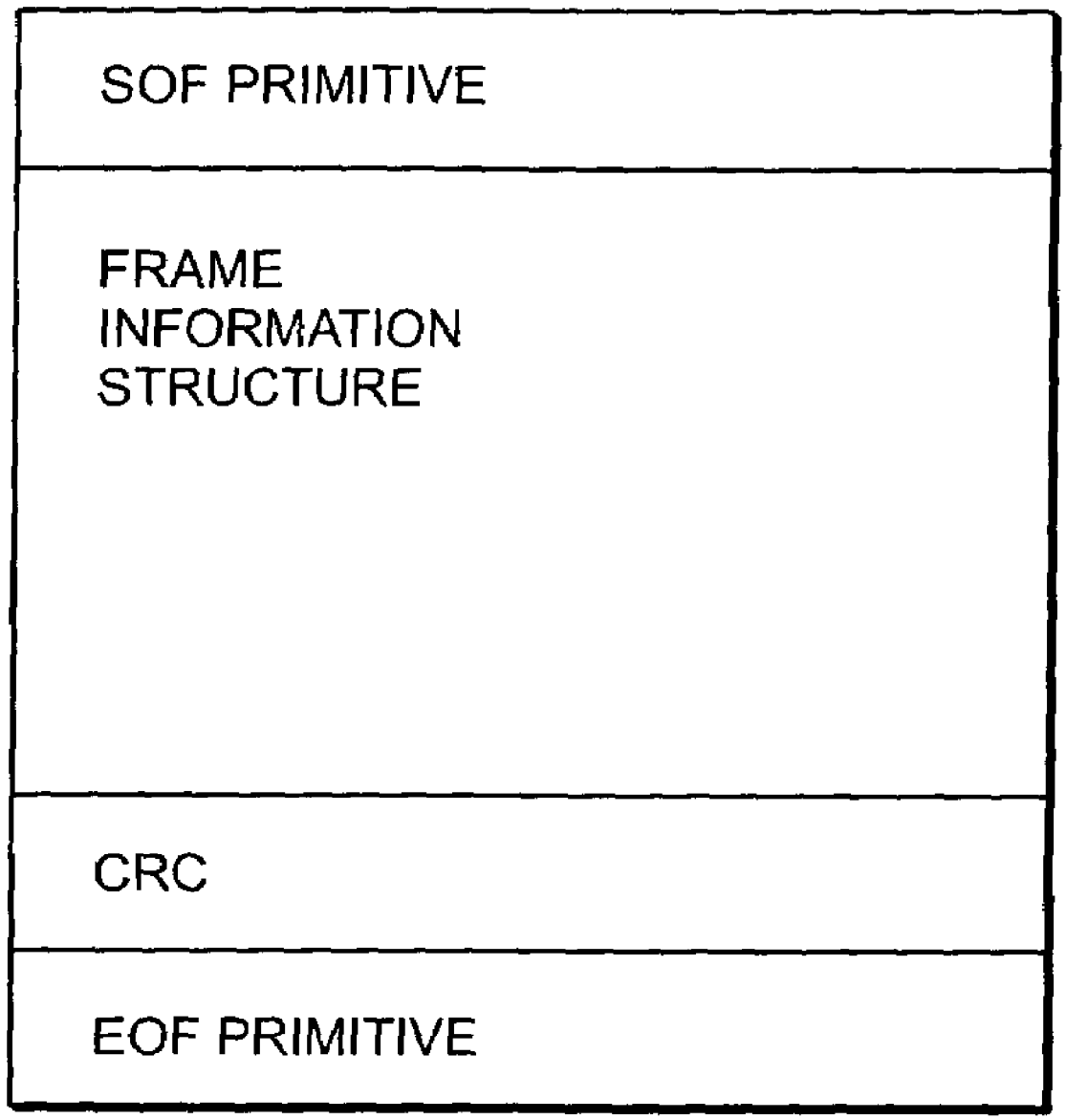
FIG._5

US 7,496,691 B2

STANDARD ATA QUEUING AUTOMATION IN SERIAL ATA INTERFACE FOR CREATING A FRAME INFORMATION STRUCTURE (FIS) CORRESPONDING TO COMMAND FROM TRANSPORT LAYER

FIELD OF THE INVENTION

The present invention generally relates to the field of serial data communications, and particularly to a method and circuit for processing/handling serial ATA queue commands automatically for Serial Advanced Technology Attachment devices.

BACKGROUND OF THE INVENTION

Current Serial Advanced Technology Attachment (SATA) devices communicate through their higher layers. Because so much of the communications travel between applications programs, handshaking is not as fast a process as it could be. The frame Information Structures (FIS) used by SATA tend to be problematic in interrupting the higher layer programs. Because the higher layer programs, whether implemented as firmware or software and whether implemented in the central processing unit, handle the FISes, performance is reduced drastically.

Therefore, it would be desirable to provide a method and circuit that improves the speed of communications within an SATA device.

SUMMARY OF THE INVENTION

Accordingly, the present invention is directed to a method and circuit that reduces handshaking processing time by moving handshaking processing to a standard ATA queuing automation circuit. The circuit of the present invention handles FIS transmission and reception for queued ATA commands automatically. Because the present invention automatically handles FIS transmission and reception of the serial ATA interface by hardware, communications with high level layers of the interface is avoided, thereby greatly increasing performance.

In a first aspect of the present invention, a standard advanced technology attachment queuing automation circuit has a first circuit for storing a command from a higher layer. A second circuit creates a frame information structure corresponding to the command, communicates with a transport layer, and transmits the frame information structure to the transport layer. The third circuit receives the Frame Information Structure (FIS), decodes and takes the necessary action (depending upon the received FIS, it sets up the FIS transmission, programs/activates DMA engine for payload data transfer, and updates the completion status of the command). The first circuit receives the command from the higher layer through a command to be executed queue.

In a second aspect of the present invention, a method for a method for facilitating handshaking between the higher layers of a host device and the lower layers of a host device includes the steps of entering a command in a command to be executed queue, retrieving the command via an automation circuit, checking conditions associated with the command, and communicating with a transport layer to perform an action associated with the command.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 illustrates a basic block diagram of the standard ATA queue automation circuitry of the present invention;

FIG. 2 illustrates an expanded view of FIG. 1;

FIG. 3 illustrates a basic flow diagram of the standard ATA queue automation circuit processing;

FIG. 4 illustrates an exemplary implementation of the circuit of the present invention; and FIG. 5 illustrates the general structure of a frame used by ATA.

DETAILED DESCRIPTION OF THE INVENTION

Reference will now be made in detail to the presently preferred embodiments of the invention, examples of which are illustrated in the accompanying drawings.

The present invention relates to a method and circuitry for facilitating handshaking across the protocol hierarchy within a serial ATA device. The standard ATA queue automation circuitry handles all the transmit/receive frame information structure (FIS) operations for ATA queue commands without interrupting the higher-level software and associated hardware, firmware, and drivers. If the standard ATA queue automation circuitry and command queues are not provided, then every FIS operation will interrupt the higher layer applications program. Although the present invention preferably is practiced in accordance with the SATA 1.0 and ATA/ATAPI-6 specifications, both herein incorporated by reference, the present invention is not limited to such.

FIG. 1 shows a basic block diagram of an SATA Host in communication with a remote SATA device 40. The higher layers 10 are the applications programs that run on the SATA Host. In order to communicate with other devices the applications program commands are translated to lower level language code and then to machine code. The conversion to lower level and machine code occurs in the transport, link, and physical layers 30. Instead of requiring the high layer application programs to manage the queued ATA command, the present invention places this management process in hardware as standard ATA automation circuitry 20.

The standard ATA queue automation circuitry 20 handles all the intermediate operations for a queued command. It takes the commands from the commands to be executed queue when available and handles command execution completely until the command either is fully executed, fails, or times out. The standard ATA queue automation circuitry 20 provides status to the higher layers regarding the successful completion of the command by updating the completed command tag into a command completion queue. In ATA, each queue command has its own unique tag value to identify the commands. In the current embodiment, the standard ATA queue automation circuitry 20 supports, but is not limited to, 0-31 TAGs. In variations of the circuitry, 0-15 or another subset of 32 available TAGs (i.e., 0 to n, where $n \leq 31$) may be used.

FIG. 2 illustrates an expanded functional block diagram for the standard ATA queue automation circuitry 120. As illustrated, the higher layer and automation circuitry manages both commands to be executed queue 110 and the completed commands queue 115. These two queues 110, 115 preferably are implemented in hardware as first in first out (FIFO) devices. However, these queues 110, 115 may be implemented within an applications program, as arrays, tables, records, data structures, or the like, or as a standalone software routine or separate software routines. In other words, the commands to be executed queue 110, the completed commands queue 115, and the standard ATA automation circuitry 120 are all separable entities. A requirement of the present invention is that the standard ATA automation circuitry 120 is implemented in hardware. Either or both of the queues 110, 115 are implemented, preferably, in hardware or, alternatively, in software. One or both of the queues 110, 115 may be incorporated within the standard ATA automation circuitry 120 or may be implemented between the higher layers 105 and the standard ATA queue automation circuitry 120. Any type of command may be stored in commands to be executed queue 110. For an ATA non-queue command, only one command is taken from the commands to be executed queue 110 and fully executes before another command is taken from the commands to be executed queue 110; that is, even though the commands are queued up in the commands to be executed queue 110, only one command executes at a time for the non-queue command. For an ATA queue command, a new command is executed from the commands to be executed queue 110 whenever there is a BSY/DRQ bit OFF. In operation, the higher layer places the command into a commands to be executed queue (e.g., FIFO) and receives an interrupt whenever there is at least one completed command in the completed commands queue (e.g., FIFO). For example, if the higher layer were to issue 10 commands, the completed commands queue would be examined for the entry of 10 completed commands. Actually, in this embodiment, the standard ATA queue automation circuitry determines whether the command in the commands to be executed queue is an ATA queued command or ATA non-queued command.

The present invention is directed to the handling of ATA queue commands. The opcode directs the device in a Register Host to Device FIS operation. If the command is a non-queued command, then the device does not queue up the received command but instead services that command immediately. In an ATA queue command, for example, the driver/firmware/hardware generates an opcode as a queued command. For example, 8'hCC designates a queued write command and 8'hC7 designates a queued read command. If the device detects a queued command, the device may not process the command immediately. Instead the device sends a D2H RegFIS for BUS REL to the host (i.e., a Register—Device to Host FIS that has the REL bit in the Sector Count Field set to one). A BUS RELEASE from the device indicates that the device has received the command, is not going to process the command immediately, is releasing the bus (e.g., clearing the BSY bit in a status register, such as the task file register), and is ready to receive any other new commands.

The host executes the next command in the commands to be executed queue FIFO, directly from the software queue, directly from the driver/operating system, or the like. In an embodiment, the device may receive the command from the host and store the command in the device's own queue structure. For example, the device may queue up the commands to a maximum of 32 and process a command randomly by setting a SERV bit in SetDevFIS or D2H RegFIS for BUS REL or D2H RegFIS for STATUS to the host (i.e., an inquiry to the host if the host is ready to process any queued up commands). The host adapter sends a Service command 8'hA2 through RegFIS (H2D—host to device) and waits for the TAG to identify the command the device is trying to process at the moment. To provide command identification, each queue command has a unique TAG.

FIG. 3 illustrates a flow chart of the processing by the standard automation queue circuitry. In FIG. 3, the standard ATA queue automation circuitry always checks whether a command from the commands to be executed queue 205 is available to issue to the target device (e.g., a disk drive), whether any FIS 210 (Frame Information Structure, as defined per Serial ATA spec 1.0) received indication from the Serial ATA Transport/Link layers (i.e., from the target device), or whether any pending TxServiceCmd/TxDataFIS transmits an FIS request generated by a queue automation circuitry. (Note: The FIS reception has higher priority than FIS transmission requests including issuing a new command from the command queue.) When there is a transmit FIS or receive FIS request, the standard ATA queue automation circuitry checks the conditions in the order as indicated in FIG. 3. In the case of FIS transmission, the first condition is the determination as to whether there is a transmit service command 215. If there is, the standard ATA queue automation circuitry automatically sets up the TxFIS type with the correct FIS type value (i.e., 8'h27) and writes the command task file register with 8'hA2 (i.e., the Service Command Opcode). Also, the standard ATA queue automation circuitry issues a request to transmit a Service Command on H2D RegFIS 220 (H2D—Host to Device) and clears the TxServiceCmd bit or word. Next, a determination is made as to whether payload frame information structure is to be transmitted 225 on H2D Data FIS for a write queue command operation. If it is, then the queue automation circuitry sets up the transmit FIS type as a DATA FIS type (i.e., 8'h46) and issues a request to the transport layer to send a data frame information structure to the target device. The TxDataFIS bit or word is cleared or reset. No further processing is performed if the device is busy 235 (i.e., BSY bit is ON). If the device is not busy and a queue command is available 240, the queue automation circuitry initiates H2D RegFIS for command and sets the BSY bit to ON 245 in the task file register, sets the Transmit FIS type to 8'h27, and sets the C-bit to ON in a H2D command RegFIS automatically. The Device BSY ON blocks the issuance of additional new commands from the commands to be executed queue until the commands currently being executed are terminated or finished or the bus is released (D2H RegFIS for BUS REL) from the device. In the case of FIS reception the frame information structure type is checked 250. If the received FIS type is basically a D2H RegFIS then the automation circuitry automatically decodes further to find out whether the received D2H RegFIS is for 1) BUS release 225, 2) TAG 265, or 3) command completion status 305, based on the bits in the received D2H Reg FIS. If it is a BUS REL, the standard ATA queue automation circuitry may issue a new command if there is a command available in the commands to be executed queue since the BSY bit is cleared in the received D2H Register FIS with REL bit ON. In case the SERV bit is ON in Bus Release, the standard automation circuitry normally prefers to service the target device's queued command process request by setting a signal TxServiceCmd (TxServiceCmd=ON) rather than issuing a new command from the commands to be executed queue. That is, the standard queue automation circuitry gives higher priority to service the issued commands. A programming option may be provided to select the priority between issuing a new command and servicing the queued up command. (Note: The device may indicate its readiness to process the queued up commands by setting a SERV bit in D2H RegFIS for BUS REL or D2H RegFIS for Status or SetDEV FIS). If the received FIS type is a D2H RegFIS and not for a Bus Release, the D2H RegFIS is examined for a TAG 265 automatically by a standard queue automation circuitry. (Note: If the received D2H RegFIS is for a TAG, it is understood that the device and host already exchanged readiness signals and have set the BSY bit to ON in the task file register when it sends a Service Command 8'hA2 in H2D RegFIS.) The standard ATA queue automation circuitry stores the received TAG internally and uses the TAG until the command is completed. If the command is not completed for a TAG, the standard queue automation circuitry further examines the registers for a command completion STATUS and updates the completed command TAG into an array 315 automatically. Although the term array is used, another software structure, such as a table or record, or a hardware circuit, such as a first in first out (FIFO) memory device, may be used. The higher layer gets interrupted when the completion array write and read points are not equal and reads the completed commands queue to find out the completed commands. The device may later indicate its readiness to process the queued-up commands by sending a SetDevFIS 275 (D2H—Device to Host) to the standard ATA queue automation circuitry. When the standard ATA queue automation circuitry detects SERV bit is ON, TxServiceCmd is set to 1 (Transmit Service Command 8'hA2) 280 automatically. This request triggers the transmission of SERV Command (8'hA2) RegFIS (H2D) to the target device. In response to a Service command, the target device sends RegFIS (D2H) for TAG to indicate the current process command. The standard queue automation circuitry uses the stored TAG for both DMA controller programming and a command completion update at the end of the command in the completed commands queue. The standard queue automation circuitry programs the DMA engine when it receives either DMA Activate FIS 285, 290 (for queued DMA write command) or D2H Data FIS 295, 300 (for queued DMA read command) from the device. When the standard ATA queue automation circuitry receives a DMA Activate FIS 290 for a write command, the standard ATA queue automation circuitry provides the current TAG and initiates the DMA Engine programming/activation. (TAG information is used to program the DMA engine with the right context.) Also, the standard ATA queue automation circuitry sets up the data transmit request signal (TxDataFIS=1) automatically to transmit a Data FIS (H2D) to the target device. Similarly, the standard queue automation circuitry automatically initiates the DMA programming and activation when the Data FIS (D2H) is received from the target device for a queued DMA read command.

As described, the higher layer issues command from the commands to be executed queue when the ATA queue command is available to send (to the device or other target device). Upon successful execution of the command, failure of execution of the command, or a time out conditions, the standard ATA queue automation circuitry transmits the completed command information back to the higher layer. The standard ATA queue automation circuitry completely blocks all the intermediate communications to the higher layer and handles its own internal communications until the command completion. The Serial ATA transport layer communicates with the standard ATA queue automation circuitry throughout the completion stage. The standard ATA queue automation circuitry analyzes all the received FIS from the transport layer from the device (e.g., disk drive, tape drive, CD ROM, etc.) and transmits the right FIS to the drive. The standard ATA queue automation circuitry writes the task file registers when there is a command available from the higher layer. Whenever the task file command is written to by the automation circuitry, the transport layer transmits a Command Register FIS to the drive. Before writing a command to the task file command register, the task file register 125 is loaded with data values and other parameters. Then, the Command is transmitted to the drive. The standard automation circuitry always stores the TAG of the command when issuing to the device 245. This stored TAG is used when the device processes the command immediately without sending BUS REL, SetDevFIS, TAG on D2H RegFIS, etc. (Note: Even though the command is a queued ATA command, the device may process the queued command immediately as a non-queued command operation when it is ready. If the command is a queued write, the device directly sends a DMA Activate FIS. If the command is a queued read, the device directly sends a payload DATA FIS without sending any D2H RegFIS for TAG. In this case, the TAG stored in. 245 is used to program the DMA controller. The device normally queues up the commands (a maximum of 32 commands in the present example) and processes the commands randomly. For example, if the host controller has issued 32-commands to the drive, each command includes information such as data transfer length, TAG, and opcode. The opcode might indicate a write command (i.e., writing data to the disk) or a read command (i.e., reading data from the drive). Data Length (i.e., Sector Count) may indicate the number of sectors to be written to or read from. When the device processes a command, the device sends the unique TAG of that command by using D2H (device to host) Register FIS. Thus, the host adapter receives the information regarding that particular tag and loads the DMA engine with the right addresses, data, and the like to transfer the data to the right place. The TAG is a universal reference and is entered into the TaskFile register when the Command RegFIS issues.

The Device and Host controller Serial ATA Transport/Link Layer are able to operate with the predefined FIS format. The TaskFile Register information and payload data are used to construct the FIS format to transmit. The host sends the following FISs:
1) Register—Host 2 Device FIS-->send Command or Control. (Based on the "c" bit it can be detected as a control or command.) (Note: Control is mostly used to send a 'Software Reset' to the drive.)
2) DATA FIS-->bi-directional (i.e., the Host or Device can send and/or receive this FIS.)

The target device (i.e., drive or other device) sends the following FISs:
1) Register-Device to Host FIS-->Device uses this Structure to send STATUS BUS REL, and TAG by setting bits in D2H RegFIS (D2H RegFIS Type=8'h34).
2) SetDevFIS—Device to Host FIS,-->when the target device is ready to process a queued up command, when BSY bit is OFF, the target device issues a SERVICE request by setting SERV bit in SetDev FIS.
3) DMA Activate FIS-->If the command is a write command (i.e., writing data to the drive) and the target device is ready to receive the payload DATA FIS from the host then the target device sends DMA Activate FIS to the host.

The standard ATA queue automation circuitry handles the protocol for any given FIS. A simple queued read/write flow is explained below. For example, when the device transmits SetDev FIS, the host controller has to send SERVICE Command 8'hA2 to indicate it is ready to process and sets the BSY bit in the host controller until the command has successfully executed, failed, or timed out. Then, the device will send a D2H RegFIS for TAG indicating the disk is ready to process the command corresponding to the TAG.

FIG. 4 illustrates an exemplary block diagram of the automation circuitry. The commands from the higher layers may be input to the commands to be executed queue 410. A BSY/DRQ (data request) bit from the task file status register 425 may be inverted 405 and ANDed 415 with a command available bit that is set when the read and write pointers for the commands to be executed queue are not equal. The transport layer 440 provides an FIS received bit or bit pattern that determines whether FIS decoding 435 or automatic FIS transmit logic 420 is to be performed. The automatic FIS transmit logic 420 may send an FIS transmit request and TxFIS type to the transport layer 440. The automatic FIS transmit logic may set values in the task file registers 425. The FIS decoding logic 435 receives FIS from the target device and may send TxServiceCmd FIS and TxData FIS to the automatic FIS transmit logic 420. The FIS decoding logic 435 programs and activates the direct memory access (DMA) engine to transmit/receive data to/from the device using Tx/Rx Data Buffer 460 in SATA Host controller. The Tx/Rx Data Buffer 460, when prompted, sends/receives data to/from the transport layer 440. The FIS decoding logic 435 also loads the completed commands queue 445 with the completed command TAG when the command is successfully executed. The automation circuitry interrupts the higher layer immediately when the command fails or times out (e.g., error conditions).

FIG. 5 illustrates the basic structure of a frame that is transmitted from the host to the drive. The frame starts with a Start of Frame primitive and ends with an End of Frame primitive. The frame information structure is the payload. A checksum is provided after the payload. The checksum may be cyclic redundancy code.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A standard advanced technology attachment queuing automation circuit, comprising:
    a first circuit for storing a command from a higher layer of a serial advanced technology attachment (SATA) device;
    a second circuit for creating a frame information structure (FIS) corresponding to the command, communicating with a transport layer of the SATA device, and transmitting the frame information structure to the transport layer of the SATA device; and
    a third circuit for receiving a FIS from the transport layer of the SATA device, decoding the received FIS, and taking an appropriate action.

2. The standard advanced technology attachment queuing automation circuit of claim 1, further comprising a command completion queue.

3. The standard advanced technology attachment queuing automation circuit of claim 2, wherein the command completion queue is implemented in software.

4. The standard advanced technology attachment queuing automation circuit of claim 2, wherein the command completion queue is implemented in hardware.

5. The standard advanced technology attachment queuing automation circuit of claim 4, wherein the command completion queue is a first in first out device.

6. The standard advanced technology attachment queuing automation circuit of claim 4, wherein the command completion queue is loaded from the standard advanced technology attachment queuing automation circuit.

7. The standard advanced technology attachment queuing automation circuit of claim 1, wherein the first circuit receives the command from the higher layer through a command to be executed queue.

8. The standard advanced technology attachment queuing automation circuit of claim 7, wherein the command to be executed queue is implemented through software code.

9. The standard advanced technology attachment queuing automation circuit of claim 7, wherein the command to be executed queue is implemented through hardware.

10. The standard advanced technology attachment queuing automation circuit of claim 9, wherein the command to be executed queue is implemented as a part of the standard advanced technology attachment queuing automation circuit.

11. The standard advanced technology attachment queuing automation circuit of claim 9, wherein the command to be executed queue is implemented as separate from the standard advanced technology attachment queuing automation circuit.

* * * * *